R. E. ROSEWARNE.
VARIABLE SPEED MECHANISM.
APPLICATION FILED NOV. 16, 1907.
936,363.
Patented Oct. 12, 1909.
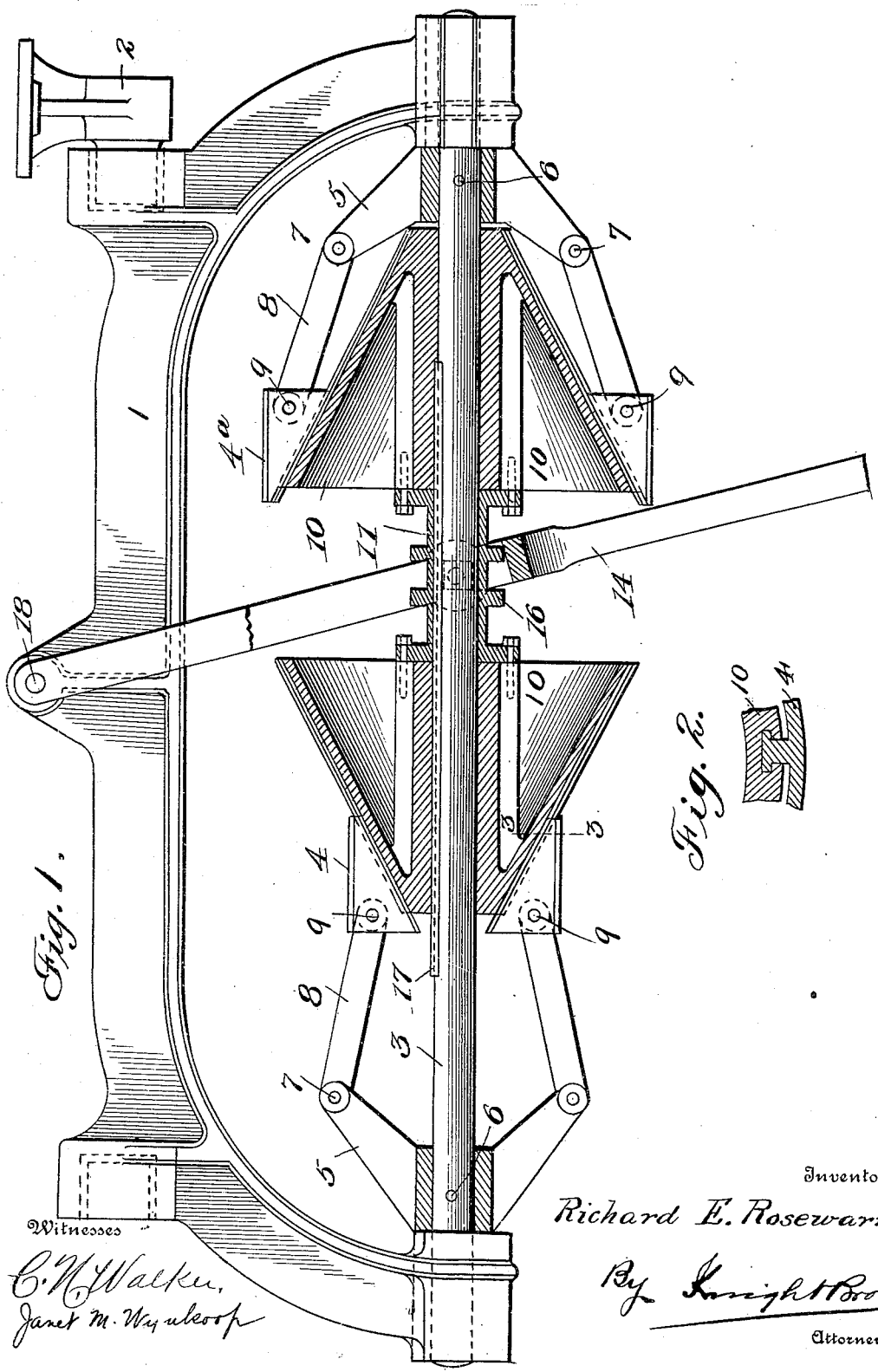
Witnesses
C. W. Walker,
Janet M. Wynkoop
Inventor
Richard E. Rosewarne
By Knight Bros
Attorneys

UNITED STATES PATENT OFFICE.

RICHARD E. ROSEWARNE, OF COVINGTON, KENTUCKY, ASSIGNOR TO THE MILLER, DU BRUL & PETERS MANUFACTURING COMPANY, OF CINCINNATI, OHIO, A CORPORATION OF OHIO.

VARIABLE-SPEED MECHANISM.

936,363.           Specification of Letters Patent.      Patented Oct. 12, 1909.

Application filed November 16, 1907. Serial No. 402,473.

*To all whom it may concern:*

Be it known that I, RICHARD E. ROSE-WARNE, a citizen of the United States, residing at Covington, in the county of Kenton and State of Kentucky, have invented certain new and useful Improvements in Variable-Speed Mechanism, of which the following is a specification.

My present invention relates to pulleys having means through which their diameters may be changed at will for the purpose of varying the ratio of transmission and particularly to an arrangement in which a pair of such pulleys are mounted upon a common shaft and provided with balanced expanding and contracting means which reciprocally expand and contract the pulleys, and adapt them for use as in a speed jack or other transmission gear where like conditions are to be met.

In my application Serial No. 387,209, I have presented certain improvements in expansible pulleys wherein are employed a plurality of longitudinal rim-forming members of each of two pulleys with expanding means coöperating with said members so as to cause them to move in radial lines outward or inward for the purpose of varying the diameter of the pulley; the controlling means for the respective pulleys being in the form of cones whose faces extend in opposite directions so that when moved jointly, one pulley will be expanded while the other is permitted to contract; and the corresponding members of the respective pulleys being so mounted on opposite ends of intermediately fulcrumed arms that their movements in opposite directions are enforced, while their engagement with the expanding cones is such that the cones maintain direct driving connection between the shaft and the pulleys formed by said members, and the resistance imposed upon a pulley moving in a direction to expand the members is largely offset by the compression of the retracting pulley acting upon the cone which simultaneously recedes. The bases of the cones were presented outwardly while their apexes were presented inwardly and the cones were yoked together by a sleeve sliding upon the shaft. The pulley sections or members were integral with the intermediately fulcrumed arms being formed by the outer ends of said arms, which were appropriately curved in order to provide a constant crest for the pulley at any angular position assumed by the members.

According to my present invention, the pulley forming members or sections are separate from and jointed to fulcrumed arms and as they maintain a constant angular position when sliding on conic surfaces of the expanding cones, their outer faces are in the form of sections of a normal drive pulley; moreover, they are preferably inter-engaged with the expanding cones, as by T-joints, to sustain them against centrifugal tendency. With this method of providing the pulley sections in the form of members which maintain constant angular relation to the cones, and interlocking them with the cones I am also enabled to simplify the construction somewhat by placing the cones base to base in intermediate position and anchoring or securing the pulley forming members against material longitudinal movement, by dividing the arms so that the pulley members of each pulley are provided with independent connections in the form of links extending from spiders fixedly mounted on the shaft. This arrangement also enables me to economize space by disposing the shifting lever at an intermediate position upon the device.

My present invention will be fully understood upon reference to the accompanying drawings, in which, Figure 1 is an axial sectional view of a portion of a speed jack in which one form of my present invention is embodied; Fig. 2 is a section on the line 2—2, Fig. 1.

1 represents a hanger frame trunnioned in the brackets 2 (one only being shown) and having journaled in it the shaft 3.

4 4ᵃ represent pulley sections or members which constitute the respective pulleys to be reciprocally expanded and contracted. 5, 5, represent spiders keyed to the outer ends of the rotating shaft by transverse pins 6 and providing fulcrums 7 for the links 8 which are jointed at 9 to the rim sections 4, 4ᵃ. The respective members or rim sections of the pulleys thus connected are free to move in radial planes and notwithstanding their arcuate paths in said planes due to the links 8, they are free to assume at all times, positions which will bring their outer or beltbearing faces parallel to the axes about which they revolve. To control the movement of these rim forming sections 4, 4ª, I provide a pair of cones 10 mounted upon the shaft 3 with their bases opposed, and splined to said shaft to enforce their rotation with the shaft while permitting axial movement thereon, and these cones are connected by an intermediate sleeve 11 which enforces simultaneous axial movement in them. The rim forming sections 4, 4ª, are slidingly mounted and radially confined upon these cones by T-heads and slots providing interlocking joints between them so that the rim forming sections are not only forced to rotate with the cones, but they are sustained against tipping and centrifugal tendency. A lever 14 fulcrumed at 18 and having trunnion connections 16 with the sleeve 11 controls the longitudinal movement of the pair of connected cones on the shaft 3. As the cones move in an axial direction, the rim formed by the sections mounted upon one cone contracts as the rim formed by the sections mounted upon the other cone expands, and vice-versa.

Having thus described my invention, what I claim as new therein and desire to secure by Letters Patent is:

1. In an expansible pulley or speed jack, the combination with a drive-shaft; of spiders keyed upon the outer ends thereof; links projecting inwardly from each of said spiders; rim-forming members pivoted to and longitudinally sustained by said links each of said members being provided with a T shaped foot; a pair of expanding cones with opposed bases mounted to slide longitudinally upon said shaft but forced to rotate therewith said cones being provided with T slots for slidably engaging the rim forming members; an intermediate rigid connection between the opposed bases of said cones; and a lever for longitudinally reciprocating said cones through the intermediate connection.

2. In an expansible pulley or speed jack, the combination with the drive shaft, of spiders keyed thereon; links pivotally connected with said spiders; a pair of rigidly connected expanding cones longitudinally slidable upon the shaft but forced to rotate therewith, the outer conical surfaces of said cones being provided with grooves; and rim-forming members pivotally connected to said links and provided with feet whereby they are adapted to slide in said grooves.

3. In an expansible pulley or speed jack, the combination of two series of rim-forming members coaxially mounted; intermediately connected expanding cones coaxially mounted with the rim-forming members and provided with grooves; and an intermediately mounted controlling lever adapted to move the expanding cones longitudinally, said rim-forming members being provided with means for slidably engaging said cones in the grooves provided therein.

4. In an expansible pulley or speed jack, the combination with an integral swinging bracket; of a drive shaft carried thereby; intermediately connected expanding cones slidably mounted on said drive shaft and forced to rotate therewith; a controlling lever pivotally mounted on said swinging bracket intermediately to said expanding cones; and series of rim-forming members slidably mounted upon the convex surfaces of said cones.

The foregoing specification signed at Cincinnati Ohio this thirty first day of August, 1907.

RICHARD E. ROSEWARNE.

In presence of two witnesses:
C. I. DU BRUL,
JNO. B. PATZOLD.